United States Patent
Dewey et al.

(10) Patent No.: US 11,687,278 B2
(45) Date of Patent: Jun. 27, 2023

(54) DATA STORAGE SYSTEM WITH RECENTLY FREED PAGE REFERENCE STATE

(71) Applicant: Seagate Technology LLC, Cupertino, CA (US)

(72) Inventors: Douglas Dewey, Longmont, CO (US); Ian Davies, Longmont, CO (US); Ryan Phillips, Longmont, CO (US)

(73) Assignee: Seagate Technology LLC, Cupertino, CA (US)

(*) Notice: Subject to any disclaimer, the term of this patent is extended or adjusted under 35 U.S.C. 154(b) by 377 days.

(21) Appl. No.: 16/457,068

(22) Filed: Jun. 28, 2019

(65) Prior Publication Data
US 2020/0409598 A1    Dec. 31, 2020

(51) Int. Cl.
*G06F 3/06* (2006.01)

(52) U.S. Cl.
CPC .......... *G06F 3/0659* (2013.01); *G06F 3/0604* (2013.01); *G06F 3/065* (2013.01); *G06F 3/0653* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 5,355,483 A | * | 10/1994 | Serlet .................. G06F 12/0269 711/154 |
| 6,651,075 B1 | | 11/2003 | Kusters et al. |
| 7,162,662 B1 | | 1/2007 | Svarcas et al. |
| 7,467,167 B2 | | 12/2008 | Patterson |
| 7,475,098 B2 | | 1/2009 | Patterson et al. |
| 7,568,080 B2 | | 7/2009 | Prahlad et al. |
| 7,657,721 B2 | | 2/2010 | Nakano et al. |
| 7,685,360 B1 | | 3/2010 | Brunnett et al. |
| 9,009,106 B1 | * | 4/2015 | Aron ....................... G06F 16/00 707/610 |
| 9,311,016 B2 | | 4/2016 | Ezra et al. |
| 9,378,235 B2 | | 6/2016 | Bestgen et al. |
| 2017/0351447 A1 | * | 12/2017 | White .................. G06F 9/45558 |

* cited by examiner

*Primary Examiner* — Michael Alsip
(74) *Attorney, Agent, or Firm* — Hall Estill Law Firm; Randall K. McCarthy

(57) ABSTRACT

A data storage system can connect a data storage controller to a host and a data storage device. A first reference state corresponding to a first zone of the data storage device can be incremented in response to a first version of data being assigned to the first zone by the data storage controller. A second version of the data may be written to a second zone of the data storage device prior to populating a recently freed list with the first zone having an incorrect reference state. The first zone can be allocated by the data storage controller for new data without altering the incorrect reference state that is subsequently written to the first zone as directed by the data storage controller.

20 Claims, 3 Drawing Sheets

DATA STORAGE SYSTEM WITH RECENTLY FREED PAGE REFERENCE STATE

SUMMARY

Various embodiments of the present disclosure are generally directed to a data storage controller administering a data page reference state for a memory, such as, but not limited to, a flash memory in a solid state drive (SSD).

In accordance with some embodiments, data storage system connects a data storage controller to a host and a data storage device. A first reference state corresponding to a first zone of the data storage device is incremented in response to a first version of data being assigned to the first zone by the data storage controller. A second version of the data is written to a second zone of the data storage device prior to populating a recently freed list with the first zone having an incorrect reference state. The first zone is allocated by the data storage controller for new data without altering the incorrect reference state prior to the new data being written to the first zone as directed by the data storage controller Other embodiments employ a data storage system with a data storage controller connected to a host and a data storage device to increment a first reference state corresponding to a first zone of the data storage device in response to a first version of data being assigned to the first zone by the data storage controller. A second version of the data is written to a second zone of the data storage device prior to the data storage controller evaluating a performance impact of updating the first reference state to a correct reference state. The data storage controller populates a recently freed list with the first zone having an incorrect reference state in response to the performance impact being greater than a predetermined threshold. New data is then allocated to the first zone by the data storage controller without altering the incorrect reference state and the new data is subsequently written to the first zone as directed by the data storage controller.

A data storage system has, in various embodiments, a data storage controller connected to a host and a data storage device with the data storage controller configured to increment a first reference state corresponding to a first zone of the data storage device in response to a first version of data being assigned to the first zone by the data storage controller. A second version of the data is then written to a second zone of the data storage device and a recently freed list generated by the data storage controller with the recently freed list populated with the first zone having an incorrect reference state. The data storage device is configured to allocate new data to the first zone without altering the incorrect reference state.

These and other features which may characterize various embodiments can be understood in view of the following detailed discussion and the accompanying drawings.

DETAILED DESCRIPTION

Without limitation, the various embodiments disclosed herein are generally directed to a data storage system employing a controller that intelligently updates pages of memory.

When adding on-disk metadata to explicitly track data accesses, such as in the event a logical volume of data is deleted, updated, or involved in a snapshot, the metadata is altered. While updates to a logical volume of data can be tracked anywhere in a data storage system, tracking logical volumes with on-disk metadata involves a reference count structure that is laid out by the physical geometry of the underlying memory where a single data page contains information that is logically contiguous for the data volume. Hence, a single data page access involving a continuous logical data volume can correspond with the alteration of multiple different on-disk metadata reference counts.

Accordingly, embodiments of a data storage system minimize the number of memory accesses need to alter a logical volume of data by introducing an intermediate page reference state. The ability to accurately track logical data addresses with minimal reference count involvement allows a data storage system to enjoy optimized performance with heightened resource utilization. The use of an intermediate data page reference state allows a data storage controller to allocate new data addresses more efficiently than updating a data page reference each time a data page is accessed.

Figure 1:
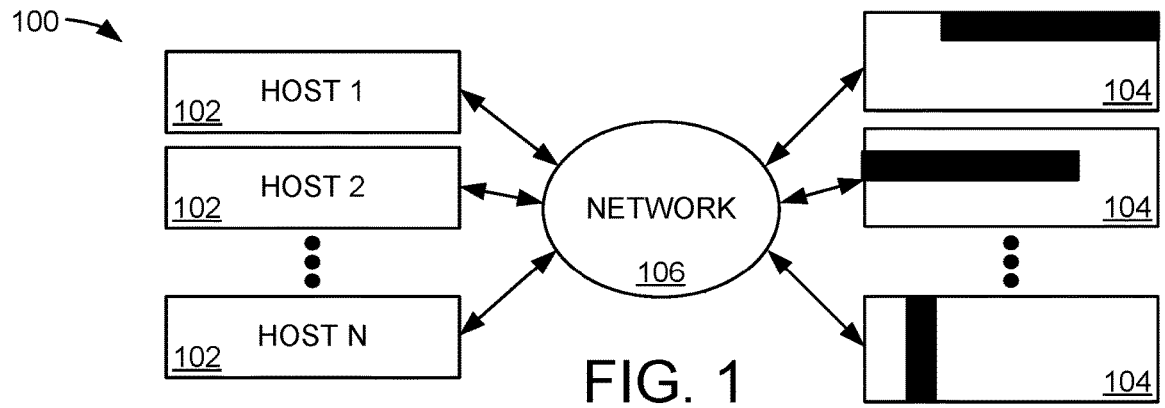
FIG. 1 provides a functional block representation of a data storage system in which various embodiments can be practiced.

These and other features may be practiced in a variety of different data storage devices as part of a data storage system, but various embodiments conduct logical data tracking optimization in the example data storage system 100 of FIG. 1. The simplified block representation in FIG. 1 conveys how the system 100 can connect any number (N) of hosts 102 with a number (X) of data storage devices 104 via one or more interconnections that make up a wired and/or wireless network 106. The system 100 can be utilized to provide a diverse variety of computing capabilities, such as data generation, data transfer, and data storage.

While not required, each host 102 and/or data storage device 104 can be a stand-alone computing device, such as a computer, network node, or server. The respective hosts 102 can, alternatively, be a component that is integrated into larger computing devices, such as a controller, microprocessor, or other programmable circuitry. The respective data storage devices 104 and/or hosts 102 may, in some embodiments, comprise a computing components, such as a local processor, memory array, power source, and data repository.

As shown by shaded regions 108, some, or all, of the various data storage devices 104 can be utilized as a redundant array of independent devices (RAID) where data copying, mirroring, striping, and/or parity can be employed to increase the reliability, and accessibility, of stored data. Although the respective data storage devices 104 can be different physical components, at least one device 104 may be a virtualized component. For instance, multiple data storage devices 104 can part of a single physical memory, such as a solid-state memory array or rotating magnetic media.

Figure 2:
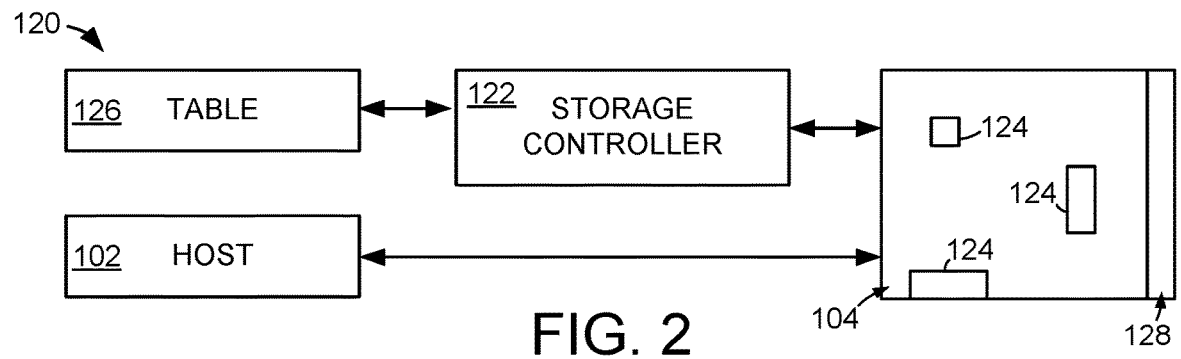
FIG. 2 diagrams aspects of an example data storage system constructed and operated in accordance with some embodiments.

FIG. 2 depicts portions of an example data storage system 120 arranged to transfer and store data in accordance with assorted embodiments. Data sourced from a host 102 can be transferred to a physical, or virtual, data storage device 104. Operation of the data storage device 104 can be directed by a local, or remote, data storage controller 122 that can be configured to dictate the physical address 124 of incoming data as well as the maintenance of stored data from a group of different available physical addresses 124.

As a non-limiting example, the storage controller 122 can generate, update, and remove entries of one or more tables 126 that corresponds with physical, or logical, portions of the data storage device 104. The storage controller 122 may additionally maintain metadata 128 that describe the stored data. It is contemplated that the metadata can be physically located anywhere in the data storage system 120, but some embodiments maintain metadata in the same logical, or physical, memory as the stored data. The data storage controller 122 can manage updates of existing data via the table 126 and/or metadata 128.

In some embodiments, the data storage controller 122 conducts snapshots of the data stored in the data storage device 104. A snapshot can be characterized as information that identifies the data at a point in time. As such, a snapshot may be a data block that is logically smaller than the data it identifies that is stored in one or more tables 126 to allow the controller 122 to sequentially identify versions, and status, of data over time. A snapshot can be compared to metadata that identifies more information about the stored data, such as forward pointers and/or error correction. A snapshot can, alternatively, be characterized as a logically lighter, physically smaller, and less robust version of metadata that can efficiently be generated, stored, and updated over time compared to a metadata.

It is contemplated that a table 126 can be stored in the data storage device 124, either as maintenance data, user data, or metadata. Such a table 126 can store snapshots alone, or with other page data, such as reference states and/or page tracking information. Hence, the storage controller 122 can provide intelligent data control and tracking that allows data to be reliably stored and reconstructed, as needed. However, the maintenance of multiple different data tracking states, metrics, or values can burden storage controller 122 operation, particularly when data is written to a diverse variety of physical addresses 124 in the data storage device 104.

Figure 3:
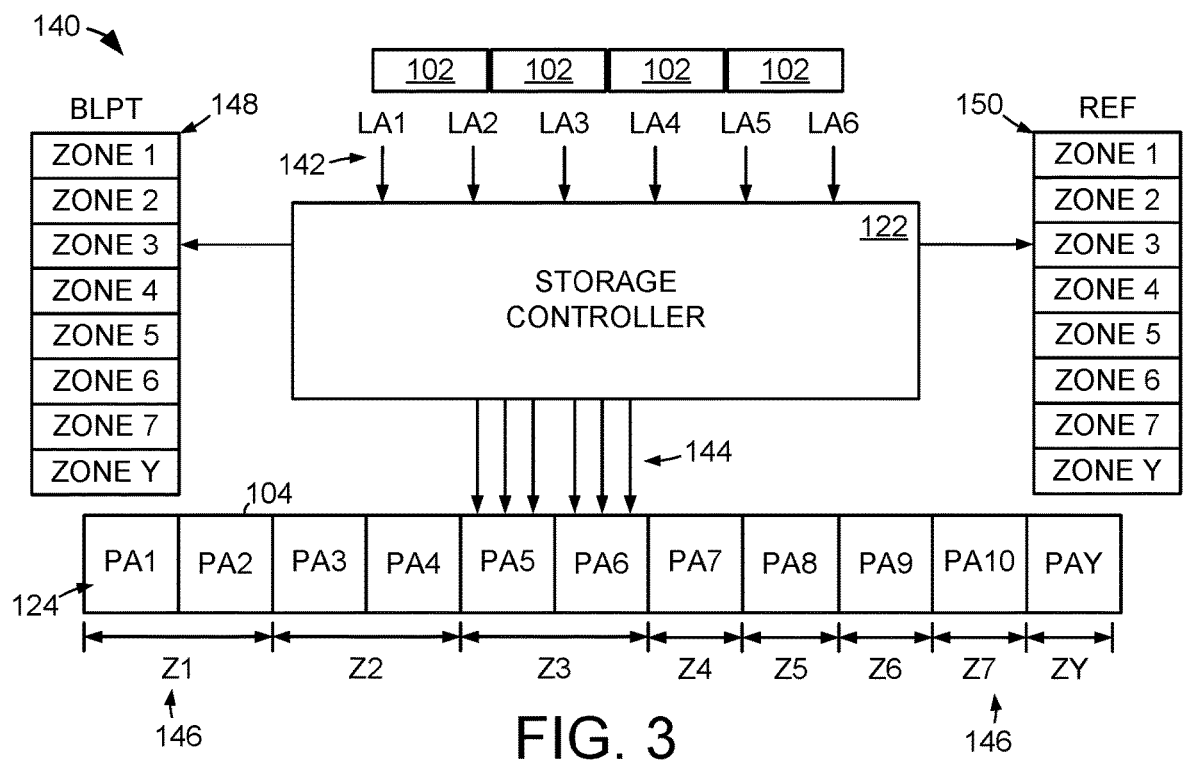
FIG. 3 displays a functional line representation of portions of an example data storage system arranged in accordance with assorted embodiments.

FIG. 3 displays a functional block representation of portions of an example data storage system 140 configured and operated in accordance with various embodiments. One or more storage controllers 122 can direct operations between at least one data storage device 104 and at least one host 102. In response to executed, active, or queued data writes, as conveyed by solid arrows 142 that correspond with different logical addresses (LA), a storage controller 122 can generate physical address 124 destinations (PA) that are carried out at a time scheduled by the controller 122, as shown by solid arrows 144.

The physical memory of the data storage device 104 can be logically, or physically, divided into zones 146 that span one, or more, physical data addresses 124. It is noted that user, and host, data can be located in one or more logical zones (Z1-ZY) concurrently, such as in the case of outdated data or redundant copies of up-to-date data. In the event host data is written to physical addresses 124 within a single zone 146, as shown in FIG. 3, the storage controller 122 updates a first table 148, which may be a bottom level page table (BLPT), and a reference table 150. The BLPT may have one or more corresponding tables, such as a top level page table (TLPT), which collectively operate to identify at least the physical location of the current version of a logical data address.

The maintenance of a separate reference state for at least each zone 146 by the storage controller 122 allows for additional information about the physical addresses 124 to be tracked, such as number of data accesses, if a zone is occupied with data, or if a zone is available for future host-initiated data writes. In some embodiments, the reference table 150 is merely a list of the reference states physically stored in the respective zones 146 of the data storage device 104. Regardless of where the reference table 150 is stored, the updating of separate tables 148/150 can provide additional protections and data storage accuracy, but at the expense of increased storage controller 122 load.

Figure 4:
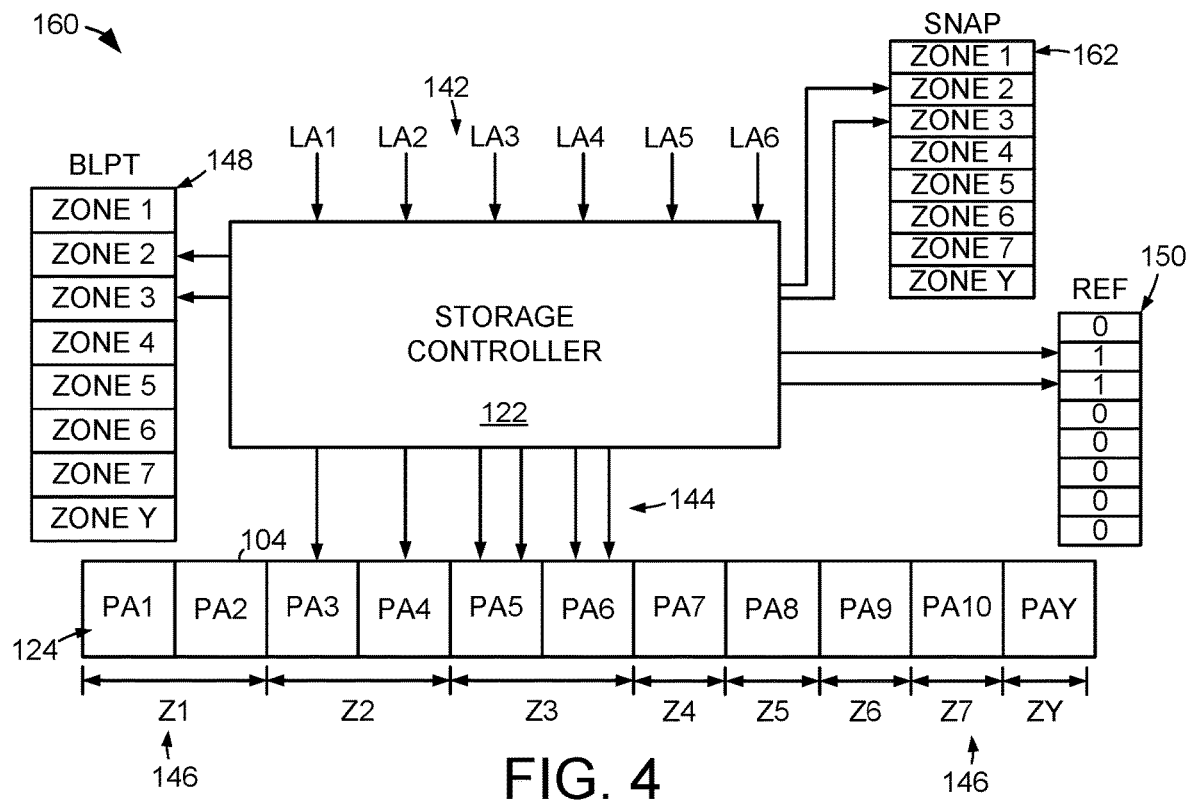
FIG. 4 illustrates a functional line representation of portions of an example data storage system arranged in accordance with various embodiments.

The load on the storage controller 122 can be exacerbated with the continuous, or sporadic, execution of data snapshots. FIG. 4 illustrates a functional block representation of portions of an example data storage system 160 that incorporates a snapshot table 162 in accordance with assorted embodiments. As shown, the storage controller 122 can be configured to separately maintain at least a BLPT 148, reference table 150, and snapshot table 162 that track independent, but related, aspects of the data stored in the various zones 146 of one or more data storage devices 104.

It is noted that multiple different snapshot tables 162 can concurrently be present to describe the respective zones 146 of one or more data storage devices 104. For instance, each snapshot of a data storage device 104 can be stored in a single table 162 that is archived to identify the status of the data stored in the various zones 146. Alternatively, a single snapshot table 162 can be partially, or completely, overwritten to identify stored data status. The various tables 148/150/162 can be stored in a single data storage device 104, such as the device 104 storing data described in the tables, or in other temporary, or permanent memories connected to the storage controller 122.

The maintenance of the snapshot table 162 can supplement the reference states stored in the reference table 150, which indicate the number of updates conducted on a particular zone of data, and the page table 148 information, which indicates the physical location of the current version of a logical block address, to allow the storage controller 122 to provide current and accurate data to a host 102 upon request, even if that request triggers the controller 122 to reconstruct some, or all, of the data in a zone 146.

It is contemplated that when adding on-disk metadata to explicitly track data page reference counts as well as existing page tables when a logical volume of data is altered, such as being deleted, updated, or undergoing a snapshot, a reference state/count of the reference table 150 is incremented. The reference state/count structure corresponds with physical geometry of the underlying data zones 146 whereas a single page table 148 contains information that is logically contiguous for the logical volume of data. Hence, a single page table update could involve changing reference counts for each zone 146 of a data storage device 104, which could be as high as 4096 different reference states/counts.

With the various embodiments that involve a recently freed zone reference state to track free or altered data zones, the number of memory accesses needed to alter, or take a snapshot of, a logical volume of data is minimized. Without the addition of a recently freed data zone reference state, the data storage controller 122 would have degraded, slow performance during the deletion, or snapshot, of logical data volumes stored non-sequential physical data addresses of data storage device 104. It is noted that updates to the various tables 148/150/162 can be conducted asynchronously, but relatively large volumes of non-volatile memory, and processing power, would be occupied in order to track the pending work.

In other words, the logical pages of the BLPT 148 can correspond with data that is scattered amongst numerous different physical zones 146, which results in updating large numbers of different references in response to data being updated or snapshots being taken. For instance, when writing new data, updating existing data, or moving data in the various zones 146 of the data storage device 104, the BLPT 148 is updated to reflect the changes to the logical data, which can cause the reference values/states of numerous zones 146 to be subsequently updated. The addition of zone 146 reference updates in response to snapshots further exacerbates the performance demands, and resulting performance degradation, of the storage controller 122. Thus, the addition of a recently freed reference state for a data zone allows for efficient tracking of data page deallocations from which new page allocations are initially distributed, or moved to a permanent page reference structure during background data storage system operations.

Figure 5:
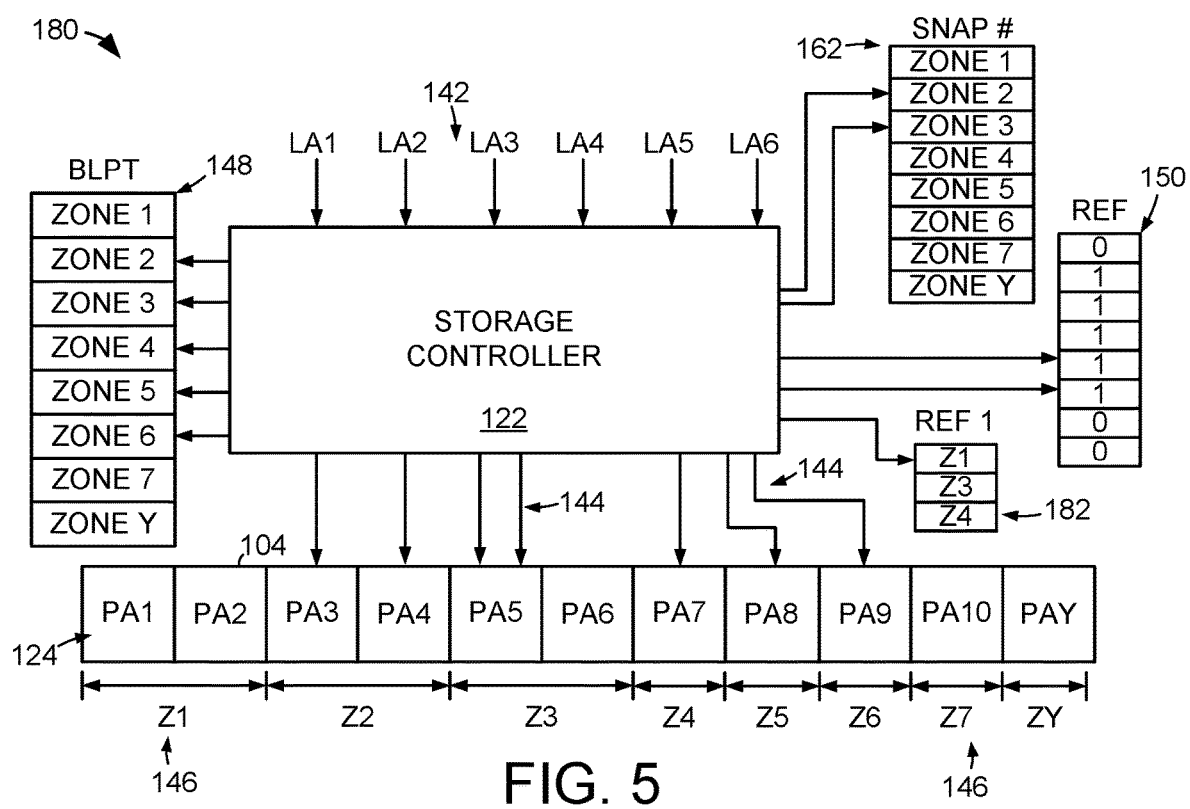
FIG. 5 depicts a functional line representation of portions of an example data storage system arranged in accordance with some embodiments.

FIG. 5 conveys portions of an example data storage system 180 that utilizes a recently freed reference state in accordance with some embodiments. As shown by the exemplary reference values of the reference table 150 that correspond with different physical zones 146, a zone 146 can have a reference state of "0" that corresponds with a free distinction where the physical addresses of the zone 146 is not in any page table 148. A zone 146 may alternatively have a reference state of more than "1" that corresponds with the zone 146 being occupied and present in at least one page table 148. As discussed with regard to FIG. 4, updating a BLPT 148, such as a result of a data alteration or snapshot, can cause a large number of zone 146 reference states to be individually updated.

By identifying when a physical address of a zone 146 is no longer occupied by current host data, the storage controller 122 can populate a separate list 182 of zones 146, data pages, and/or data addresses that have a greater than 0 reference state and are scheduled to be reset to a 0 reference state in the future. The maintenance of the list 182 of recently freed locations in the data storage device 104 allows the storage controller 122 to ignore updating the reference state for those data locations. Hence, the list 182 comprises locations in the data storage device 104 that no longer have current host-initiated data and that have an incorrect reference state.

With the recently freed list 182, the reference state/count in the reference table 150 will be 1 to indicate the corresponding zone/page is not in a page table 148. However, the storage controller 122 can report that the data locations identified in the recently freed list 182 are free and available for new data. Accordingly, the recently freed designation corresponding with storage in a non-volatile memory location separate from the reference table 150 or BLPT 148 acts as an intermediate reference state to allow for efficient allocation of new data allocations without having to update the reference state of the identified data location.

It is noted that the identification of a data zone/page/address in the recently freed list 182 coexists with the reference state stored in the reference table 150, but the reference state of the reference table 150 will be an incorrect description of the zone/page/address. Due to the logical order of pages of data in the BLPT 148, along with the ability to utilize a faster memory, the maintenance of the recently freed list 182 can be more efficiently maintained than the various reference states located in the respective zones 146.

With the recently freed reference state identified in the list 182, the storage controller 122 can schedule and perform updates to the reference states located in the respective zones 146 asynchronously in order to coalesce the logical data updates with other updates the same data region. Such efficient asynchronous reference state updating provided by the recently freed list 182 can increase storage controller 122 performance by allowing reference state updates to be scheduled so that controller 122 performance is not degraded.

In some embodiments, the recently freed list 182 is employed for new data location allocation, which eliminates the need to update the reference state of the respective zones/pages/addresses. As a non-limiting example, the storage controller 122 can first allocate destinations for new host-initiated data from the recently freed list 182 before polling the reference states of individual zones 146 or the reference table 150. The ability to allocate data locations that already have a "used" reference state allows the storage controller 122 to store the new data without updating the reference state of that zone/page/address.

It is contemplated that the storage controller 122 can intelligently decide whether to allocate data locations identified in the recently freed list 182. For instance, the storage controller 122 can determine the number of reference states that would need to be updated in response to a data update, or snapshot, and choose whether to utilize the entries of the recently freed list 182 or other data locations having a 0 reference state. The storage controller 122, in a non-limiting example, upon deleting, or freeing, a BLPT 148 detects the number of separate reference states that are needed to be updated and chooses to update the BLPT 148 and corresponding reference states of the respective zones/pages/locations if that number is below a predetermined threshold, such as 16.

If the number of separate reference states is above the predetermined threshold, the storage controller 122 can make a journal entry scheduling the BLPT 148 and respective reference state updates while adding the respective locations to the recently freed list 182. As such, the storage controller 122 attempts to avoid having to perform the reference state updates by allocating new data to those data locations identified in the recently freed list 182. The intelligent balancing of updating reference states or utilizing the recently freed list 182 allows the storage controller 122 to maintain a combination of free (0 reference state) data locations that are up-to-date and recently freed data locations (1 reference state) that are out-of-date to efficiently service data updates, data moves, and new data writes from one or more hosts 102.

It is contemplated that the recently freed list 182 is a metadata structure that keeps together the logically continuous data pages, which saves having to update the physical tracking structures that are dispersed, such as the reference states and other metadata. A usable, but not required, metadata structure for the list 182 can be a page table similar to the BLPT 148, which allows a top level page table to point to the recently freed list directly. The metadata structure of a recently freed list 182 further allows for a single journal entry, such as unmap, delete, or reset, to empty one BLPT and write the constituent entries into a different BLPT 148. Such a BLPT-equivalent structure additionally allows the entirety of a table to be deleted and concurrently moved to the recently freed list 182 that is identified in a top level page table entry.

It can be appreciated that the recently freed list 182 leverages journaling and allows intelligent coalescing at two data location phases, freeing and re-allocation, which avoids processing power and time that would have occurred updating various reference states if the recently freed list 182 was not utilized. It is noted that the freeing phase of a data location can be characterized as the deleting, resetting, or unmapping of an entry in a page table. In the past, a compound journal entry would be used to update the page table and the respective reference states of the data locations being updated. Employing the recently freed list 182 allows a compound journal entry to update the page table being freed while updating a single page table of the new data structure so the new structure stores multiple data pages in logical clumping instead of with physically dispersed reference states.

With a re-allocation phase of a data location without utilizing a recently freed list 182, writing data to a single data page would trigger a journal entry to update the corresponding page table and the reference of the data location. The recently freed list 182 allows re-allocation to involve no journal entries as the page table getting new data will be the same page table that previously had data deleted, moved, or unmapped. Hence, the storage controller's utilization of the recently freed list 182 provides optimized management of data updates, particularly when the data mapping page tables and/or reference states are stored in the respective zones 146 of the data storage device 104.

Figure 6:
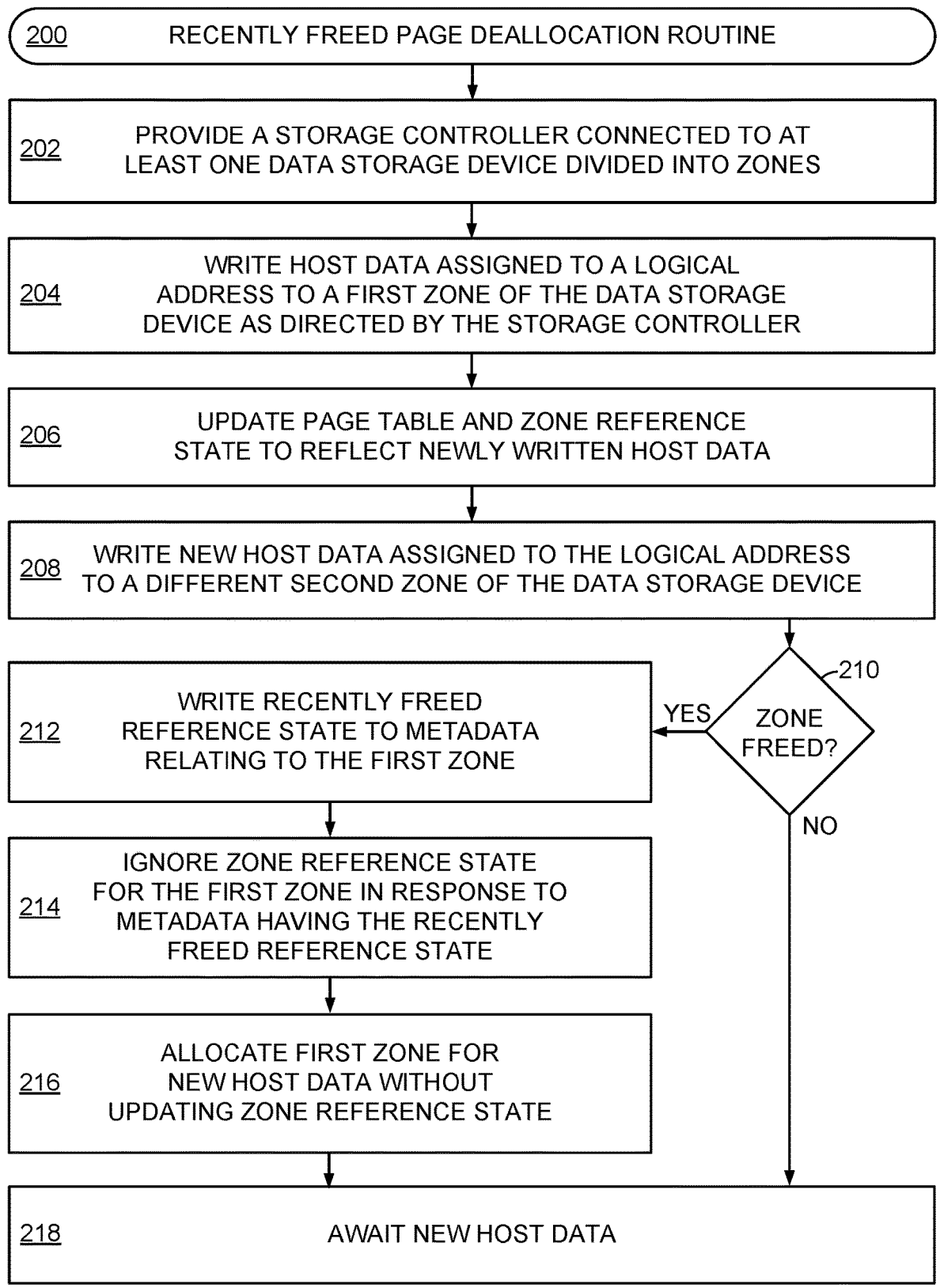
FIG. 6 is an example recently freed page deallocation routine that can be carried out with the respective embodiments of FIGS. 1-5.

FIG. 6 conveys a flowchart of an example recently freed page deallocation routine 200 that can be utilized in the assorted embodiments of FIGS. 1-5 to provide optimized data storage in a distributed data storage network. Initially, a storage controller is connected to at least one host and at least one data storage device in step 202. The data storage device can be logically divided into zones that each have a metadata structure stored in the zone, such as a reference state, page table, or both. Step 204 utilizes the storage controller to assign, and subsequently write, data from a connected host to a logical address located in a zone of a connected data storage device.

The data written to the data location in step 204 triggers step 206 to identify the host data with a page table (BLPT) entry and the updating of the zone reference state to 1 (used). Such data can remain at the initial data location for any amount of time until a new version of the data is provided by the host and the storage controller proceeds to write the new version in a different second zone of the data storage device in step 208, despite the new data having the same logical address as the initially written data. It is noted that step 208 can correspond with updating a BLPT that has logically contiguous data addresses that are physically stored in different zones, which would require reference state updates to each of those zones to provide a current, up-to-date metadata scheme for the data storage device.

While the page table and reference state updates can be conducted in association with step 208, various embodiments configure the storage controller to evaluate if the zone/page/data location of the, now out-of-date, data is to be included in a recently freed list instead of being updated in decision 210. If so, step 212 proceeds to identify the zone/page/data location of the old data in a recently freed list without updating the reference state of the zone/page/location. Hence, the zone/page/location of the old data will be made available for new data allocation while having an incorrect reference state identifier.

Step 214 then ignores the incorrect (used) reference state of the zone/page/location stored in the recently freed list before allocating that zone/page/location for new host-initiated data. Once the new data is stored in the zone/page/location from the recently freed list, the reference state will be correct without any updates. It is contemplated that one or more page tables may be updates as a result of the allocation of the recently freed list, but such updates are not required if the page table receiving the new data is the same page table that had the out-of-date data.

With the new data being stored in a zone/page/location having a correct reference state concurrently with the up-to-date version of the initial data being stored in a correctly referenced zone/page/location, or in the event the recently freed list is not employed from decision 210, step 218 awaits new host data to be written to the data storage device. It is noted that step 218 may be replaced by cycling routine 200 to step 204, but such activity is not required as any volume of new data can be written to a data storage device without subsequently being updated with newer versions.

Through the various embodiments of a data storage system, a recently freed intermediate reference state is utilized to optimize the number of data storage device accesses that are involved with the deallocation of data from a zone/page/location. The ability to intelligently balance utilization of a recently freed list with updating the page table(s) and reference states of the zones involved with a data alteration, or snapshot, allows a storage controller to provide high short-term performance while scheduling processing intensive table and reference state updates for a future time. As a result, relatively large volumes of data and data locations can be tracked without degrading short-term, or long-term data storage performance.

What is claimed is:

1. A method comprising:
   connecting a data storage controller to a host and a data storage device;
   maintaining a page table, reference table, and recently freed list separately with the data storage controller;
   incrementing a first reference state of the reference table corresponding to a first zone of the data storage device in response to a first version of data being assigned to the first zone by the data storage controller, the first reference state identifying the first zone as occupied with current data;
   writing a second version of the data to a second zone of the data storage device, the first zone subsequently having an incorrect reference state in the reference table;
   populating a recently freed list with the first zone;
   deciding, with the data storage controller, to not correct the first reference state corresponding to the first zone;
   allocating new data to the first zone without altering the incorrect reference state of the reference table; and
   writing the new data to the first zone as directed by the data storage controller.

2. The method of claim 1, wherein the data storage controller generates the page table tracking data stored on at least one zone of the data storage device, the page table stored in the data storage device.

3. The method of claim 2, wherein the page table stores locigally continuous data stored in the plurality of zones of the data storage device.

4. The method of claim 2, wherein the page table is stored in a metadata dedicated zone.

5. The method of claim 1, wherein the data storage device generates a snapshot identifying data stored in at least the first and second zones.

6. The method of claim 5, wherein the snapshot is stored in a zone of the data storage device.

7. The method of claim 1, wherein the recently freed list is stored in a zone of the data storage device.

8. The method of claim 1, wherein the recently freed list is stored in a non-volatile memory separate from the data storage device.

9. The method of claim 1, wherein the recently freed list comprises zone entries from multiple separate data storage devices.

10. A method comprising:
connecting a data storage controller to a host and a data storage device;
incrementing a first reference state corresponding to a first zone of the data storage device in response to a first version of data being assigned to the first zone by the data storage controller;
writing a second version of the data to a second zone of the data storage device;
evaluating a performance impact of updating the first reference state to a correct reference state with the data storage controller in response to the second version of data being written to the second zone;
populating a recently freed list with the first zone having an incorrect reference state in response to the performance impact being greater than a predetermined threshold;
allocating new data to the first zone without altering the incorrect reference state; and
writing the new data to the first zone as directed by the data storage controller.

11. The method of claim 10, wherein the data storage controller estimates a time and processing power corresponding to updating the first reference state to generate the performance impact.

12. The method of claim 10, wherein the new data comprises a third version of the data.

13. The method of claim 10, wherein the first and second versions of the data originate in a host connected to the storage controller via a network.

14. The method of claim 10, wherein the incorrect reference state corresponds with a used zone identifier.

15. The method of claim 10, wherein the correct reference state corresponds with a free zone identifier.

16. The method of claim 10, wherein the data storage controller allocates zones from the recently freed list before polling a reference list.

17. The method of claim 10, wherein at least one zone of the plurality of zones is virtualized.

18. The method of claim 10, wherein the data storage controller ignores the incorrect reference state of the first zone to assign and subsequently write the new data to the first zone.

19. A system comprising a data storage controller connected to a host and a data storage device, the data storage controller configured to increment a first reference state stored in a reference table in response to a first zone of the data storage device written with a first version of data as assigned by the data storage controller prior to writing a second version of the data to a second zone of the data storage device, a recently freed list generated by the data storage controller is populated with the first zone in response to the second version of data being written and first zone causing the reference state of the first zone to be incorrect, the data storage device is configured to allocate new data to the first zone without altering the incorrect reference state.

20. The system of claim 19, wherein the data storage device is logically divided into a plurality of zones that respectively correspond with a range of physical block addresses.

* * * * *